(12) United States Patent
Buthala et al.

(10) Patent No.: US 10,293,482 B2
(45) Date of Patent: May 21, 2019

(54) SELF-ASSEMBLING ROBOTIC CONSTRUCTION SYSTEM AND ASSOCIATED METHODS

(71) Applicant: ITI Electromagnetic Products, Inc., Merritt Island, FL (US)

(72) Inventors: Charles Arthur Buthala, Merritt Island, FL (US); Mark Hobbs, Merritt Island, FL (US)

(73) Assignee: ITI Electromagnetic Products Inc., Merritt Island, FL (US)

( * ) Notice: Subject to any disclaimer, the term of this patent is extended or adjusted under 35 U.S.C. 154(b) by 150 days.

(21) Appl. No.: 15/350,956

(22) Filed: Nov. 14, 2016

(65) Prior Publication Data

US 2017/0157768 A1 Jun. 8, 2017

Related U.S. Application Data

(60) Provisional application No. 62/254,214, filed on Nov. 12, 2015.

(51) Int. Cl.
*B25J 9/16* (2006.01)
*B25J 9/08* (2006.01)
*A63H 33/04* (2006.01)

(52) U.S. Cl.
CPC .......... *B25J 9/1617* (2013.01); *A63H 33/042* (2013.01); *A63H 33/046* (2013.01); *B25J 9/08* (2013.01)

(58) Field of Classification Search
CPC . B25J 9/1617; B25J 9/08; G05B 2219/40302; G05B 2219/39163; G05B 2219/40304
See application file for complete search history.

(56) References Cited

U.S. PATENT DOCUMENTS

| | | | |
|---|---|---|---|
| 1,012,002 A | 12/1911 | Payne et al. |
| 1,111,994 A | 9/1914 | Ciarlo |
| 1,112,005 A | 9/1914 | Hammann |
| 1,152,002 A | 8/1915 | Bryant |
| 1,252,000 A | 1/1918 | Green |
| 2,212,008 A | 8/1940 | Buelna |
| 3,142,013 A | 7/1964 | McGrath et al. |

(Continued)

FOREIGN PATENT DOCUMENTS

WO WO2006050070 A2 5/2006

OTHER PUBLICATIONS

"Mutual Inductance" accessed at https://www.electronics-tutorials.ws/inductor/mutual-inductance.html (Year: 2009).*

*Primary Examiner* — Adam R Mott
(74) *Attorney, Agent, or Firm* — Daniel C. Pierron; Widerman Malek, PL

(57) ABSTRACT

A robotic construction unit comprising a processor, a plurality of battery modules, and a plurality of magnetic modules. The processor is operable to control the operation of the magnetic modules. Each battery module is operable to provide power to at least one of the processor and a magnetic module of the plurality of magnetic modules. Each magnetic module is operable to alternatively establish magnetic attraction to a magnetic module of an adjacent robotic construction unit or establish magnetic repulsion to the magnetic module of the adjacent robotic construction unit.

19 Claims, 12 Drawing Sheets

(56) References Cited

U.S. PATENT DOCUMENTS

| | | |
|---|---|---|
| 3,184,882 A | 5/1965 | Vega |
| 3,192,015 A | 6/1965 | Wentorf, Jr. |
| 3,202,014 A | 8/1965 | Simpson |
| 3,311,981 A | 4/1967 | Poslusny |
| 4,142,015 A | 2/1979 | Benz |
| 4,202,004 A | 5/1980 | Andersen |
| 4,242,012 A | 12/1980 | Utt |
| 4,258,479 A | 3/1981 | Roane |
| 4,334,870 A | 6/1982 | Roane |
| 4,608,525 A | 8/1986 | Mori et al. |
| 5,152,001 A | 9/1992 | Hanamoto |
| 5,361,186 A * | 11/1994 | Tanie ............... B25J 9/00 180/8.1 |
| 5,448,868 A | 9/1995 | Lalvani |
| 5,452,199 A | 9/1995 | Murata |
| 5,746,638 A | 5/1998 | Shiraishi |
| 5,988,845 A | 11/1999 | Murata |
| 6,102,003 A | 8/2000 | Hyodo et al. |
| 6,139,160 A | 10/2000 | Frucht |
| 6,150,738 A | 11/2000 | Yim |
| 6,151,982 A | 11/2000 | Matsumoto et al. |
| 6,157,872 A | 12/2000 | Michael |
| 6,212,011 B1 | 4/2001 | Lissotschenko et al. |
| 6,233,502 B1 | 5/2001 | Yim |
| 6,233,503 B1 | 5/2001 | Yim et al. |
| 6,252,002 B1 | 6/2001 | Yamada et al. |
| 6,286,386 B1 | 9/2001 | Spletzer et al. |
| 6,292,010 B1 | 9/2001 | Persons et al. |
| 6,411,055 B1 | 6/2002 | Fujita et al. |
| 6,454,624 B1 * | 9/2002 | Duff ............... A63H 33/042 414/915 |
| 6,459,957 B1 | 10/2002 | Bennett, III et al. |
| 6,477,444 B1 | 11/2002 | Bennett, III et al. |
| 6,487,454 B1 | 11/2002 | Tymes |
| 6,575,802 B2 | 6/2003 | Yim et al. |
| 6,636,781 B1 | 10/2003 | Shen et al. |
| 6,725,128 B2 | 4/2004 | Hogg et al. |
| 6,842,246 B2 | 1/2005 | Roufas et al. |
| 7,413,493 B2 | 8/2008 | Toht et al. |
| 7,747,352 B2 | 6/2010 | Raffle et al. |
| 7,787,990 B2 * | 8/2010 | Pietrzyk ............... A63H 33/042 446/129 |
| 7,955,155 B2 | 6/2011 | Tremblay et al. |
| 7,963,771 B2 | 6/2011 | Kumagai et al. |
| 8,060,257 B2 | 11/2011 | Close et al. |
| 8,132,013 B2 | 3/2012 | Meier |
| 8,164,294 B2 | 4/2012 | Chetelat |
| 8,192,008 B2 | 6/2012 | Brust et al. |
| 8,261,986 B2 | 9/2012 | Chung et al. |
| 8,507,778 B2 | 8/2013 | Olson |
| 8,586,410 B2 | 11/2013 | Arnold et al. |
| 8,666,547 B2 | 3/2014 | Cheung et al. |
| 8,870,899 B2 | 10/2014 | Beisel et al. |
| 8,924,011 B2 | 12/2014 | Park |
| 9,004,799 B1 | 4/2015 | Tibbits |
| 9,112,001 B2 | 8/2015 | Shu et al. |
| 9,121,995 B2 | 9/2015 | Tanigawa et al. |
| 9,182,014 B2 | 11/2015 | Beck et al. |
| 9,191,995 B2 | 11/2015 | Rahman |
| 2003/0040250 A1 | 2/2003 | Yim et al. |
| 2006/0095159 A1 * | 5/2006 | Desmond ............... B82Y 10/00 700/245 |
| 2008/0046121 A1 | 2/2008 | Pao et al. |
| 2010/0219156 A1 | 9/2010 | Hipwell, Jr. et al. |
| 2011/0120252 A1 * | 5/2011 | Liu ............... B25J 19/0079 74/490.01 |
| 2012/0322339 A1 | 12/2012 | Kim et al. |
| 2013/0062153 A1 | 3/2013 | Ben-Tzvi et al. |
| 2013/0109267 A1 * | 5/2013 | Schweikardt ............ A63H 33/04 446/85 |
| 2013/0343025 A1 | 12/2013 | Bdeir |
| 2014/0077141 A1 | 3/2014 | Uyeno |
| 2014/0222198 A1 | 8/2014 | Emami et al. |
| 2014/0273730 A1 | 9/2014 | Brandwijk |
| 2014/0274416 A1 | 9/2014 | Brandwijk |
| 2014/0274417 A1 | 9/2014 | Brandwijk |
| 2015/0065007 A1 | 3/2015 | Klepper et al. |
| 2015/0079872 A1 | 3/2015 | Howard |

* cited by examiner

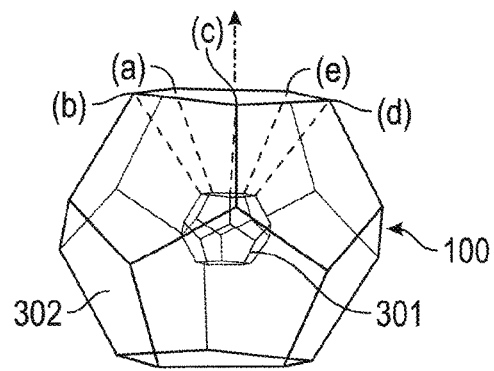
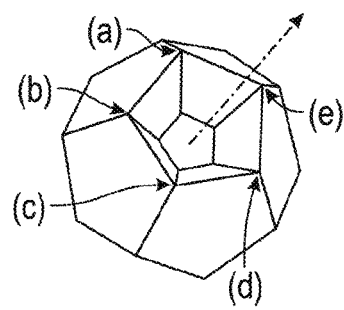
FIG. 3A     FIG. 3B
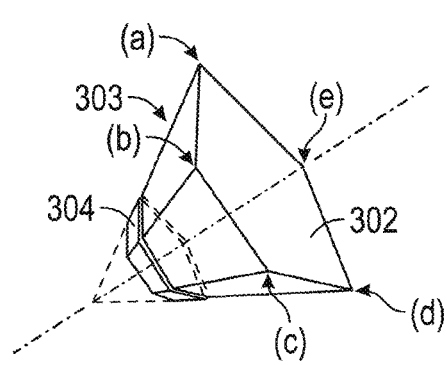
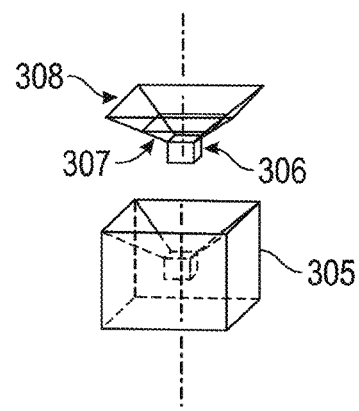
FIG. 3C     FIG. 3D

```
       4
3   CRM1   1
       2
```

FIG. 9A

```
       4              4
3   CRM1   1  3   CRM2   1
       2              2
```

FIG. 9B

```
       4              4              4
3   CRM1   1  3   CRM2   1  3   CRM3   1
       2              2              2
```

FIG. 9C

```
      4            4            4            4
3  CRM1  1  3  CRM2  1  3  CRM3  1  3  CRM4  1
      2            2            2            2
```

FIG. 9D

|   | 1 |   |
|---|---|---|
| 2 | CRM3 | 4 |
|   | 3 |   |

|   | 2 |   |
|---|---|---|
| 1 | CRM2 | 3 |
|   | 4 |   |

|   | 4 |   |   | 4 |   |
|---|---|---|---|---|---|
| 3 | CRM4 | 1 | 3 | CRM1 | 1 |
|   | 2 |   |   | 2 |   |

FIG. 10G

|   | 1 |   |
|---|---|---|
| 2 | CRM3 | 4 |
|   | 3 |   |

|   | 3 |   |   | 2 |   |
|---|---|---|---|---|---|
| 2 | CRM4 | 4 | 1 | CRM2 | 3 |
|   | 1 |   |   | 4 |   |

|   | 4 |   |
|---|---|---|
| 3 | CRM1 | 1 |
|   | 2 |   |

FIG. 10H

|   | 2 |   |   | 1 |   |
|---|---|---|---|---|---|
| 1 | CRM4 | 3 | 2 | CRM3 | 4 |
|   | 4 |   |   | 3 |   |

|   | 2 |   |
|---|---|---|
| 1 | CRM2 | 3 |
|   | 4 |   |

|   | 4 |   |
|---|---|---|
| 3 | CRM1 | 1 |
|   | 2 |   |

FIG. 10I

|   | 4 |   |
|---|---|---|
| 3 | CRM4 | 1 |
|   | 2 |   |

|   | 4 |   |
|---|---|---|
| 3 | CRM3 | 1 |
|   | 2 |   |

|   | 4 |   |
|---|---|---|
| 3 | CRM2 | 1 |
|   | 2 |   |

|   | 4 |   |
|---|---|---|
| 3 | CRM1 | 1 |
|   | 2 |   |

FIG. 10J

SELF-ASSEMBLING ROBOTIC CONSTRUCTION SYSTEM AND ASSOCIATED METHODS

RELATED APPLICATIONS

This application claims the benefit under 35 U.S.C. § 119(e) of U.S. Provisional Patent Application Ser. No. 62/254,214 titled Self-Assembling Robotic Construction System and Associated Methods filed Nov. 12, 2016, the content of which is incorporated herein in its entirety, except to the extent disclosure therein is inconsistent with disclosure herein.

FIELD OF THE INVENTION

The present invention relates to systems and methods for self-assembling robotic devices.

BACKGROUND

Self-assembling robotic devices have been an area of recent interest. Applications for such devices are far ranging and numerous. However, a number of shortcomings exist in present-day solutions, as will be shown in the following.

U.S. Pat. No. 7,787,990 titled System of Three-Dimensional Multipurpose Elements and the Method for Creating Three-Dimensional Multipurpose Elements (hereinafter "the '990 patent") is directed to a system of three-dimensional multipurpose elements consisting of single solid elements which can be computer-controlled to move, connect to one another, and disconnect from one another. The '990 patent utilizes the power of coils and thermoplastic actuators to induce a magnetic field and latching mechanisms to impart motion and to initiate connection, while mechanical means are utilized for maintaining connection. The mechanical means of connection limits mobility and increases the risk of damage. Additionally, the '990 patent utilizes electromagnets, increasing power consumption and heat generation, necessitating an active heat dissipation solution, which will drive down electrical efficiency. Furthermore, communication between adjacent elements is limited at best. Accordingly, there is a need in the art for a system that addresses potential damage and increased electrical efficiency in self-assembling robotic devices.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a robotic construction unit comprising a processor, a plurality of battery modules, and a plurality of magnetic modules. The processor may be operable to control the operation of the magnetic modules. Each battery module may be operable to provide power to at least one of the processor and a magnetic module of the plurality of magnetic modules. Additionally, each magnetic module may be operable to alternatively establish magnetic attraction to a magnetic module of an adjacent robotic construction unit or establish magnetic repulsion to the magnetic module of the adjacent robotic construction unit.

In some embodiments, each magnetic module may comprise a magnet and an actuator. The processor may be operable to control the operation of the actuator. Additionally, the actuator may be operable to change an orientation of the magnet with respect to an exterior face of the magnetic module. Furthermore, the actuator and the magnet may be operable to rotate the magnet in a plane that is generally perpendicular to a plane defined by the exterior face of the magnetic module. The magnet may be a permanent magnet.

In some embodiments, wherein each magnetic module may comprise a sensor operable to provide a feedback to the processor, and the processor may be operable to operate the magnetic modules responsive to the feedback received from the sensor. Additionally, the sensor may comprise at least one of a proximity sensor and a hall sensor. Furthermore, the sensor may comprises both a proximity sensor and a hall sensor. The hall sensor may be operable to provide feedback regarding a magnetic orientation of the magnetic module comprising the hall sensor. Additionally, the proximity sensor may be operable to provide feedback regarding the presence of an object adjacent to the magnetic module comprising the proximity sensor, the object being defined as one of an adjacent robotic construction unit and an environmental object. The processor may be operable to determine the magnetic orientation of the adjacent magnetic module from the feedback of both the proximity sensor and the hall sensor.

In some embodiments, each magnetic module comprises a communication device. The communication device may be operably coupled to the processor and to send and receive transmissions with at least one of a remote computerized device and an adjacent robotic construction unit. Furthermore, the processor may be operable to operate the plurality of magnetic modules responsive to a transmission received via the communication device. Additionally, the processor may be operable to decrypt an encrypted transmission received via the communication device. The communication device may comprise a first antenna operable for near-field communication (NFC) and a second antenna operable for radio-frequency communication other than NFC.

In some embodiments, the robotic construction unit may be operable to inductively receive electrical power via an induction coil comprised by the magnetic module. A battery module of the plurality of battery modules may be operable to receive and store the electrical power received by the robotic construction unit. Additionally, the induction coil may be operable to generate a magnetic field capable of inductively providing electrical power to an adjacent robotic construction unit.

In some embodiments, each magnetic module may comprise an exterior face. A plurality of exterior faces of the plurality of magnetic modules may collectively define a geometric configuration of the robotic construction unit. Furthermore, the geometric configuration of the robotic construction unit is a platonic solid. Additionally, the robotic construction unit may further comprise a frame, wherein the frame and the exterior faces of the plurality of magnetic modules form a hermetic seal.

In some embodiments, the plurality of magnetic modules each comprise an individual frame. In some embodiments, the robotic construction unit may further comprise a processor frame, wherein the plurality of battery modules attaches to and extends outwardly from the processor frame.

BRIEF DESCRIPTION OF THE DRAWINGS

FIG. 3a is a side view of a configurable raw material (CRM) according to an embodiment of the invention.

FIG. 3b is a perspective view of the CRM of FIG. 3a

FIG. 3c is a perspective view of a portion of the CRM of FIG. 3a.

FIG. 3d is an exploded view of a CRM having an alternative geometric configuration.

FIG. 4b is a sectional side elevation view of the portion of a CRM of FIG. 4a.

FIG. 5b is a sectional side elevation view of the portion of a CRM of FIG. 5a.

FIGS. 9a-9d are a depiction of a sequential horizontal construction of a plurality of CRMs according to an embodiment of the invention.

FIGS. 10a-10j are a depiction of a sequential vertical construction of a plurality of CRMs according to an embodiment of the invention.

DETAILED DESCRIPTION OF THE INVENTION

Figure 1:
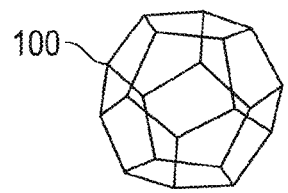
FIG. 1 is a depiction of a dodecahedral geometric configuration.
Figure 2A:
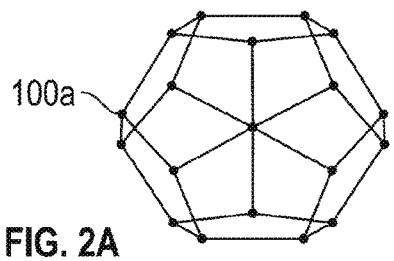
FIGS. 2A-E are depictions of multiple views of a dodecahedron of FIG. 1.
Figure 2B:
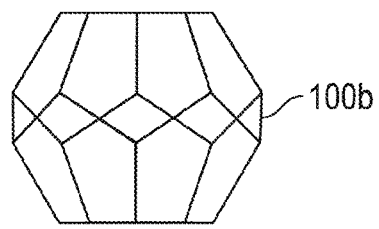
Figure 2C:
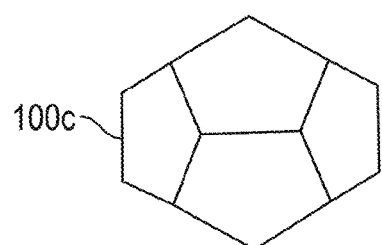
Figure 2D:
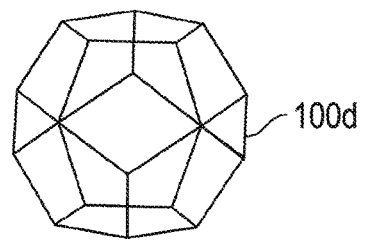
Figure 2E:
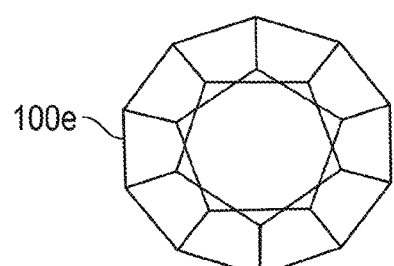

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Additionally, the terms "side" and "face" may generally indicate a specific region adjacent to a referenced structure and/or the surface of the referenced structure that is most proximal to the identified region.

An embodiment of the invention, as shown and described by the various figures and accompanying text, provides a discrete robotic units, also referred to as robotic construction units, capable of executing pre-programmed instructions from a user, and interaction with neighboring robotic units to form an assembly. The individual units, although not exclusive of other three dimensional shapes, will be considered a dodecahedron for this description. All platonic solids are contemplated and included within the scope of the invention for the shape of the robotic unit. The detailed description is broken down to physical form, assembly logic and final form of the population of Configurable Raw Material (CRM).

Referring now to FIG. 1, a dodecahedron configuration of the robotic unit configurable raw material (CRM) 100 according to an embodiment of the invention is presented. The system of CRMs will be made up of a large number of these robotic units that will connect face to face 302 between one CRM and the next. Each dodecahedron shaped CRM is capable of forming twelve connections with twelve adjacent CRMs, and six adjacent CRM's if shaped like a cube. FIGS. 2A-E show various views of the dodecahedron shape. 100a is a vertex view, 100b is an edge view of two opposing sides, 100c is an edge view, 100d is a vertex aligned view, and 100e is a view perpendicular to two opposing faces.

Referring now to FIGS. 3a-c, additional aspects of the CRM 100 will now be discussed. Each CRM 100 comprises one core processor 301 capable of read/write I/O ports, both analog and digital, or optionally exclusively one or the other, communications, power distribution, and processing capabilities located in the geometric center of the individual CRMs. The CRM 100 may comprise a core processor 301 at the geometric center of the CRM 100 dodecahedron shape, one or more battery modules 304, and a plurality of magnetic modules 303. In some embodiments, each battery module 304 of a plurality thereof may be associated with a magnetic module 303 of a plurality thereof. Furthermore, each of the battery 304 and the magnetic module 303 may be configured to contribute to the definition of the shape of the CRM 100. In the present embodiment, each of the battery module 304 and the magnetic module 303 may be configured to define a face of a dodecahedron, being one of twelve pyramidal shaped cones formed by the plurality of battery modules 304 and magnetic modules 303, a single combination of which is depicted in FIG. 3c. In some embodiments, the core processor 301 may be located elsewhere within the CRM 100 aside from the geometric center. Additionally, in some embodiments, the CRM 100 may comprise one or more core processors 301. The CRM core processor 301 may also maintain structural integrity by a frame that also aids in the connection of subsequent modules to complete the CRM 100.

In some embodiments, as illustrated in FIG. 3d the system may comprise a cubic shaped CRM 305. FIG. 3d shows a CRM 305 with one core processor 306, and one battery 307 and magnetic module 308 removed. While cubic and dodecahedral configurations are presented, it is contemplated and included within the scope of the invention that the CRM 100 may have any regular or non-regular polyhedral configuration. All possible shapes of the CRM 100 will duplicate the following mechanism and logic control as described henceforth as the dodecahedron CRM 100.

Figure 4A:
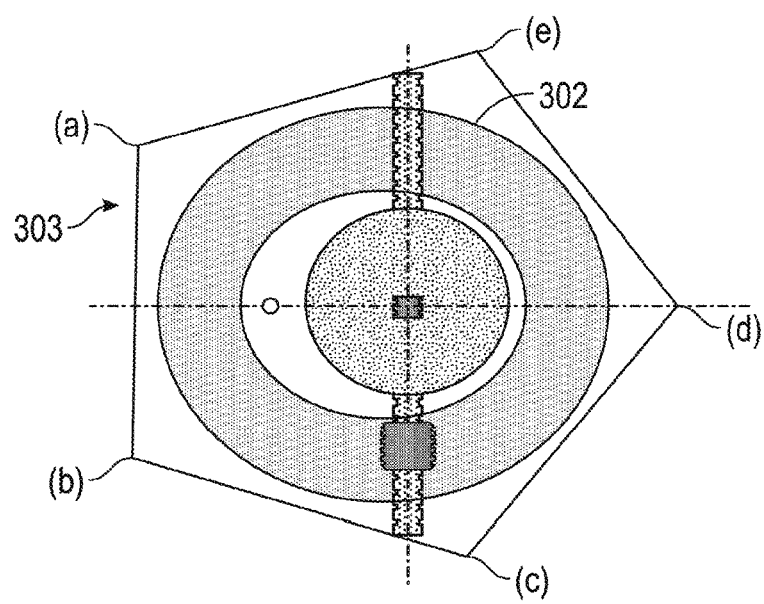
FIG. 4a is a sectional top plan view of a portion of a CRM according to an embodiment of the invention.
Figure 4B:
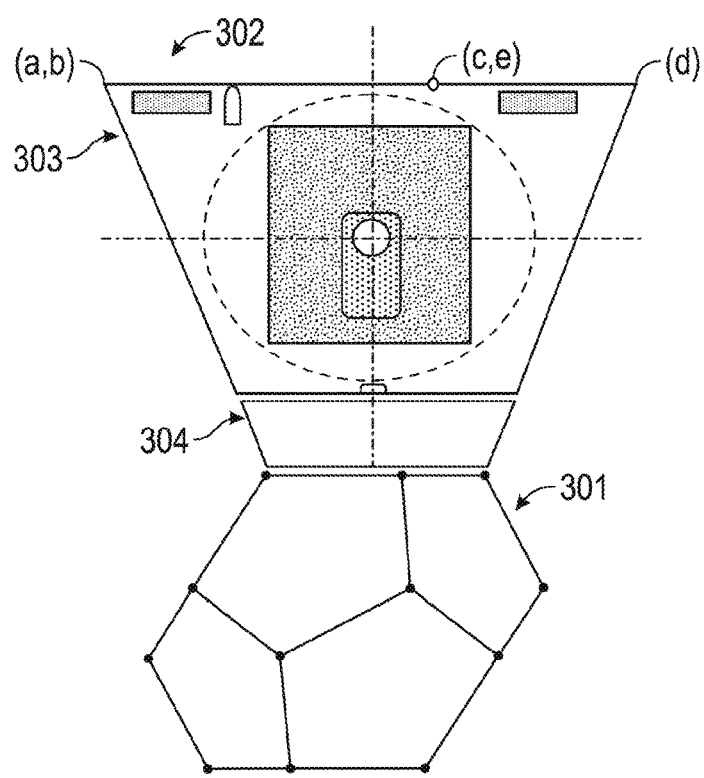

Referring now to FIGS. 4a-b, additional aspects of the CRM 100 will now be discussed. FIG. 4a is a plan view of the face 302 of the magnetic module 303 and FIG. 4b shows the core processor 301, battery module 304 and magnetic module 303 of one side of the CRM 100. Connected to the core processor 301 containing the processor, centered on each face of the CRM 100, shown as CL on FIGS. 3a-c, are twelve rechargeable battery modules 304. Each magnetic module 303 may connect to an associated battery module 304 and to adjacent magnetic modules 303 defining the shape of the CRM 100. The shape of the CRM 100 may therefore be defined by the shape of the magnetic modules 303 and the orientation of the connections therebetween. Additionally, each of the battery modules 304 and the magnetic modules 303 may be configured geometrically so as to conform to a shape of the core processor 301, more specifically the frame 309 thereof, extending outwardly from the frame 309 such that the core processor 301 may be positioned at a geometric center of the CRM 100. In some embodiments, the frame 309 may have a polyhedral configuration comprising a plurality of faces, a battery module 304 of the plurality of battery modules 304 may be attached to each face of the frame 309, and the magnetic modules 303 may attach to the battery modules 304 and extend outwardly and away from the frame 309 in a configuration conforming to the configuration of the face of the frame 309. Furthermore, the magnetic module 303 may comprise an exterior face 302 defining a portion of the external surface of the CRM 100, thereby partially defining the shape of the CRM 100. The exterior face 302 may have the same shape as an associated face of the frame 309. Both the battery modules 304 and the magnetic modules 303 may comprise individual frames to support the internal components thereof and connect to the adjoining modules made up of battery modules and magnetic modules 304 and 303. The connection between adjacent frames of the magnetic modules 303 and the faces 302 of the CRM 100 may hermetically seal the CRM 100 from the environment surrounding the CRM 100.

Figure 5A:
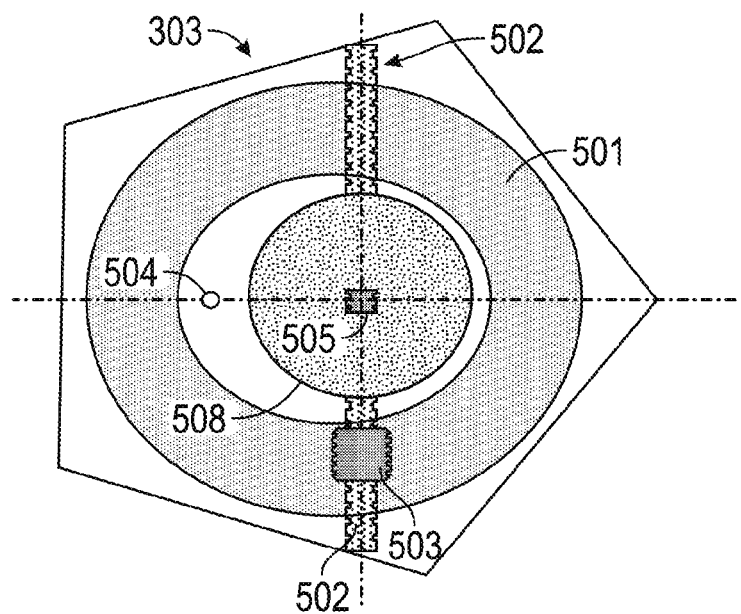
FIG. 5a is a sectional top plan view of a portion of a CRM according to an embodiment of the invention.
Figure 5B:
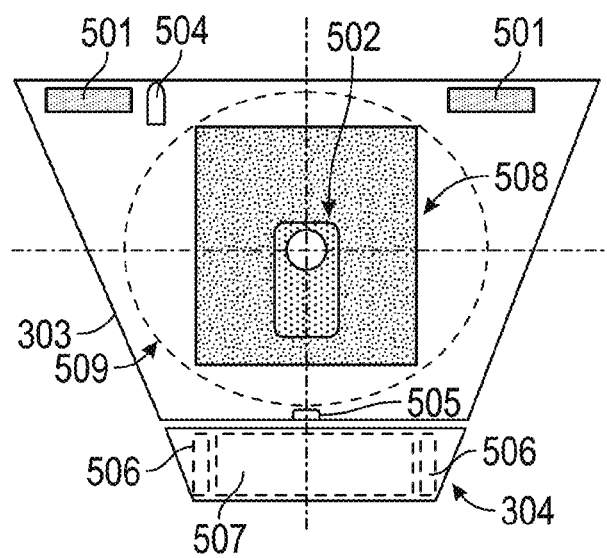

Referring now additionally to FIGS. 5a-b, additional aspects of the CRM 100 will be discussed. FIG. 5a shows a plan view similar to FIG. 4a of the face 302 of the CRM 100 and FIG. 5b show a side view of battery and magnetic modules 303, 304 that are connected together. One, some, or each battery module 304 may contain pass through electrical connections 506. The electrical connections 506 may be configured to enable electrical communication through the battery module 304 from the core processor 301 to the magnetic module 303 associated with and adjacent to the battery module 304.

Each magnetic module 303 may comprise one or more magnets 508, one or more actuators 503, one or more sensors 504, 505, and one or more external communication devices 501, including, but not limited to, antennas and electrical connectors configured to establish an electrical connection with a device external to the CRM 100 and enable charging of the battery module 304 therethrough. More specifically, the external communication device 501 may be configured to send and receive electromagnetic signals/transmissions through the air to communicate with an external computerized device, or, alternative and/or additionally, to adjacent CRMs 100. More specifically, the external communication device 501 may be configured to communicate with an external communication device using radio frequency (RF) communication, including near-field communication (NFC). Additionally, the external communication device 501 may be coupled to the core processor 301 such that transmissions received by the external communication device 501 may be delivered to the core processor 301, which may operate the CRM 100 responsive to instructions comprised by the transmissions. Furthermore, the core processor 301 may operate the external communication device 501 so as to send transmissions to a remote computerized device, or, in some embodiments, adjacent CRMs 100. Furthermore, the core processor 301 may be configured to decrypt encrypted transmissions and encrypt transmissions to be transmitted.

The magnets 508 may be configured so as to be rotated in a fixed plane 509 within the magnetic module 303 in either direction. The fixed plane 509 may be generally perpendicular to a plane defined by the face 302 of the CRM 100. The actuators 503 may be attached to the magnets 508 such that, when operated, the actuators 503 may impart motion to the magnets 508. More specifically, the actuators 503 may be attached to the magnets 508 so as to rotate the magnets 508 within the fixed plane 509. The actuators 503 may be of any type as is known in the art, including, but not limited to, stepper motors, piezoelectric devices, DC motors, and the like. Furthermore, the actuators 503 may be mounted at multiple locations within the magnetic module 303 so long as the rotation of the magnet 508 is unimpeded.

The motion of the CRM 100 may be controlled by the selective positioning and rotation of the magnet 508. Particularly, the selective positioning and rotation of the magnets 508 of the plurality of magnet modules 303 may impart motion to the CRM 100. The core processor 301 may be operably connected to the actuators 503 to control the selective positioning and rotation of the plurality of magnets 508, and therefore may control the motion of the CRM 100. The magnets 508 be positionable in a number of predetermined states defining a magnetic orientation for the magnets 508, including, but not limited to a lock position, wherein north and south poles of the magnet 508 are perpendicular to the face 302, or, defined another way, an axis running through the north and south poles is perpendicular to the face 302, an idle position, wherein the north and south poles are parallel to the face 302, and a transfer condition, wherein the north and south poles are rotated through the rotational plane 509. The magnets 508 may be either permanent magnets or electromagnets.

Each magnetic module 303 may comprise a proximity sensor 504. The proximity sensor 504 may be configured to detect the presence of an object near/adjacent or in contact with the face 302 of the magnetic module 303. Accordingly, the proximity sensor 504 comprised by each magnetic module 303 making up the CRM 100 may enable the detection of an object, being either an object in the environment (environmental object) or an adjacent CRM/robotic construction unit, near or in contact with any face of the CRM 100. Additionally, each magnetic module 303 may comprise a magnetic field detecting device, such as a hall sensor 505 to provide feedback to the core processor 301 as to the rotational position of the magnet 508, also referred to as the magnetic orientation of the magnet 508, in the magnetic module 303 comprising the hall sensor 505.

The proximity sensor 504 may be configured to provide a feedback loop to the core processor 301 to facilitate logical decision making as to which state the plurality of magnets 508 should maintain or switch to. For example, if a specific face 302 of the CRM 100 is intended to connect to the face 302 of another adjacent CRM 100 then the lock state may be initiated. When the faces 302 of the adjacent CRMs 100 are in proximity to one another, the plurality of magnets 508, including the magnet 508 most closely proximate to the adjacent CRM 100, may be rotated to enable north-south or south-north to enable attraction between the magnets 508 of each adjacent CRM 100.

Where a specific face 302 of the CRM 100 is intended to be free of any connection another CRM 100 then the state of the magnetic module 303 associated with that face 302 may be changed to magnetically repel any adjacent CRM 100. Dynamic sensing by both the proximity sensor 504 and the hall sensor 505 may enable the core processor 301 to select the appropriate state for the magnets 508 associated with the specific face 302 of the CRM 100 that are proximate to adjacent CRMs 100 so as to repel adjacent CRMs 100 from that face. More specifically, the proximity sensor 504 may provide an indication as to whether a CRM 100 is in proximity to the specific face 302, and the hall sensor 505 may provide an indication of the orientation of the magnetic field of the magnet of the adjacent CRM 100 that is most proximate thereto.

Where it is intended to maintain a specific face 302 of the CRM 100 during assembly, the magnet 508 associated with the face 302 may be put into the transfer state, wherein the magnet is rotated in either direction of the fixed plane 509. Adjacent CRMs 100 may be alternately attracted to and repelled from the face 302 of the CRM 100 in the transfer state. Moreover, the magnetic field generated by the magnet 508 may be controlled by the rotation of the magnet 508 so as to control the movement of an adjacent CRM 100. More specifically, the core processor 301 may control the operation of one or more actuators 503, thereby causing the magnet 508 to rotate in a selected direction and, in some embodiments, with a selected rotational speed. The rotating magnetic field generated by the magnet 508 may interact with a magnet 508 of an adjacent CRM 100 to initially attract the adjacent CRM 100 from a first direction and subsequently repel the adjacent CRM 100 in a second direction that is different from the first direction. Moreover, each of the proximity sensor 504 and the hall sensor 505 may provide feedback to the core processor 301 so as to provide feedback regarding the location and magnetic field of an adjacent CRM 100. Additional information regarding the transfer function, and the operations performable by the CRM 100 will be discussed in greater detail hereinbelow.

When it is intended to fix, correct, or otherwise change the orientation of one CRM 100 with respect to another adjacent CRM 100, specifically, the alignment of faces 302 adjacent one another, the magnet 508 associated with one or both of the CRMs 100 may be rotated and/or oscillated so as to vibrate the CRM 100 comprising the oscillated magnet 508. Through control of the direction, speed, and range of rotation/oscillation of the magnet 508 by the core processor 301, the magnitude and direction of vibration of the CRM 100 may be controlled to transition the CRM 100 to the selected orientation/alignment. Moreover, one or both of the proximity sensor 504 and the hall sensor 505 may provide feedback to the core processor 301 so as to determine the orientation/alignment before and during vibration of the CRM 100, and to determine when the desired orientation/alignment is achieved.

The core processor 301 is configured to maintain individual states of the plurality of magnetic modules 303 comprised by the CRM 100. More specifically, the core processor 301 may maintain the state of a magnet 508 comprised by a magnetic module 303 without influence or account of the state of any other magnet 508 of any other magnetic module 303 comprised by the CRM 100. In this way, the dynamic assembly of a structure comprised of multiple CRMs 100 may be facilitated across multiple faces of a CRM 100 simultaneously.

Additionally, each CRM 100 may comprise a unique serialization, such as a serial number or identifier, when manufactured that is unique and distinct from the serialization of any other CRM 100. This serialization facilitates the plurality of CRMs 100 to be distinguished from one another during construction. If a selected CRM 100 is intended to be included during construction, the serial number associated with the selected CRM 100 may be specifically included in the construction of the structure comprising the plurality of CRMs 100. In some embodiments, the serial number associated with the selected CRM 100 may be included in the construction of the structure in a general way, with the selected CRM 100 being deployable to any section of the structure. In some embodiments, the serial number of the selected CRM 100 may be included in the constructions of the structure in a general way, with the selected CRM 100 being specifically assigned to a specific location within the structure.

Each CRM 100 may be configured to establish electrical communication with another device external to the CRM 100. Such electrical communication may enable charging of one or more of the battery modules 304 comprised by the CRM 100 by at least one of direct connection and induction. In some embodiments, the external communication device 501 may comprise a plurality of wire coils, defined as induction coils, configured to permit a magnetic field to induce a current therein. Furthermore, the plurality of wire coils may be positioned in electrical communication with the battery modules 304 so as to charge the battery modules 304 via the current induced in the plurality of wire coils. In some embodiments, the device external to the CRM 100 that induces the current in the plurality of wire coils may be an adjacent CRM 100. Furthermore, the plurality of wire coils may be operable to permit current, to be conducted therethrough so as to generate a magnetic field. The magnetic field generated by the plurality of wire coils may induce a current in a plurality of wire coils in an adjacent CRM 100. In this way, adjacent CRMs 100 may simultaneously receive electrical power from an external device, such as a CRM 100, at an external communication device 501 of one magnetic module 303 and may provide electrical power to an adjacent CRM 100 via an external communication device 501 of another magnetic modules 303. This may be performed between any and all adjacent CRMs 100 forming a structure, such that each CRM 100 may be continuously charged, so long as a connection to an external power source is available. Such inductive charging may enable the continuous charging of the CRMs 100 while preserving the hermetic seal of each CRM 100 from the environment.

Figure 6:
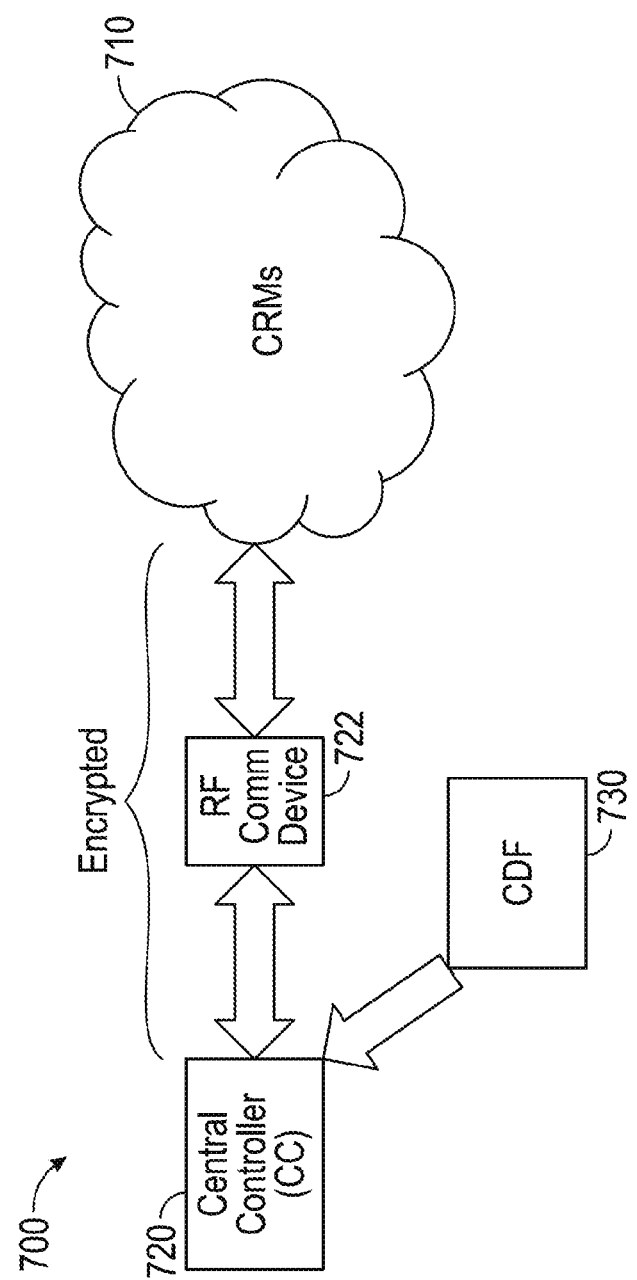
FIG. 6 is a schematic view of an interactive central controller according to an embodiment of the invention.
Figure 7:
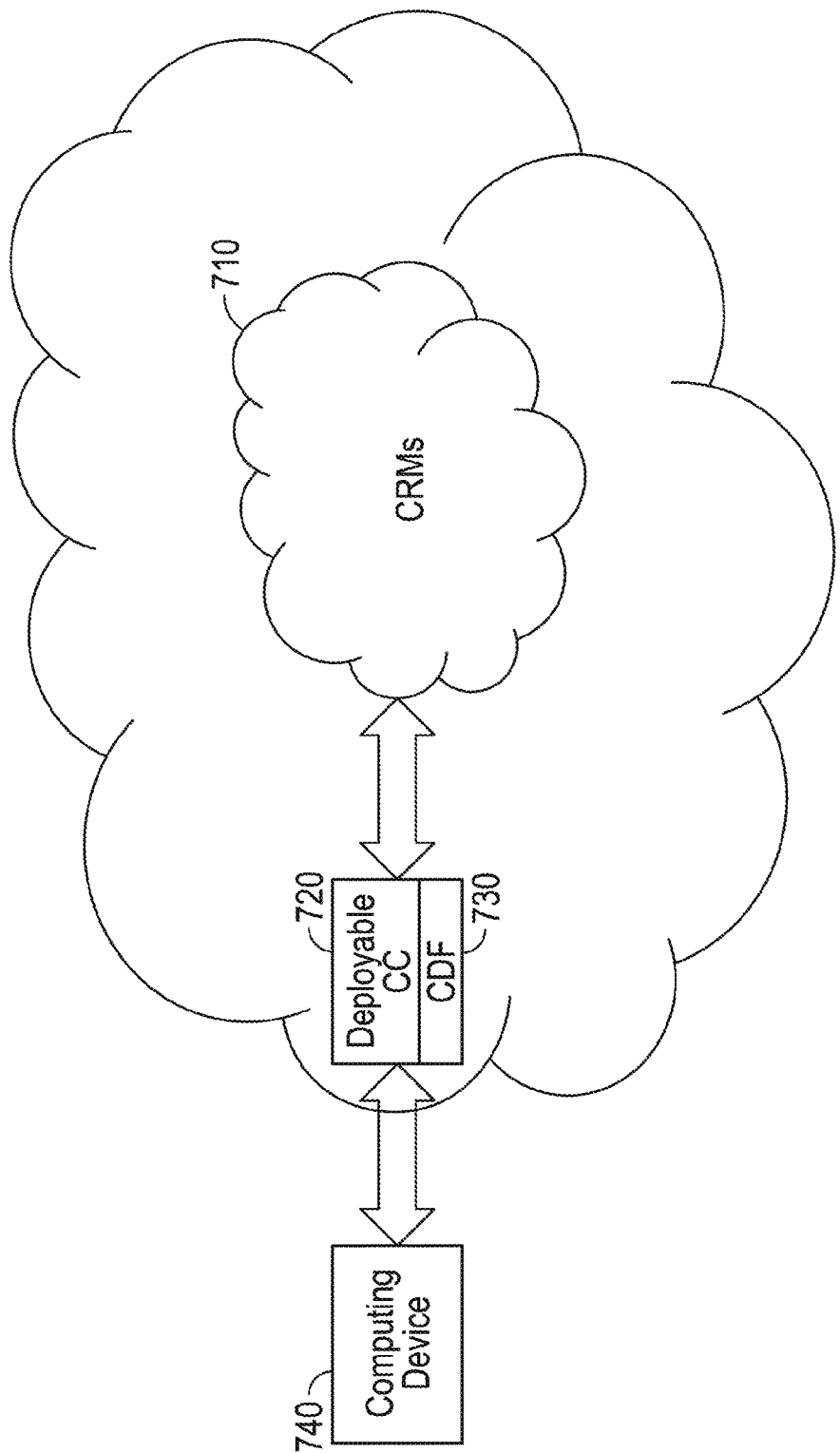
FIG. 7 is a schematic view of the process of deployment of a self-forming structure according to an embodiment of the invention.

Referring now to FIGS. 6-7, an automated assembly system 700 according to an embodiment of the invention is presented. The system 700 may comprise a plurality of CRMs 710 that may be a plurality of CRMs 100 as described hereinabove. The system 700 may further comprise a central controller (CC) 720. The central controller 720 may be an electronic device positioned in electrical communication with at least one, and in some embodiments each of the plurality of CRMs 710. More specifically, the central controller 720 may be configured to transmit instructions from a CRM design file (CDF) 730, with the CDF 730 being an input file that controls the formation of structures by the plurality of CRMs 710. The CDF 730 may be encrypted, and the central controller 720 may be configured to decrypt the CDF 730. This may prevent the CDF 730 from being accessed by any central controller 720 than the central controller 720 for which the CDF 730 is intended.

As discussed hereinabove, the central controller 720 may communicate with the plurality of CRMs 700 via wireless communication, such as RF communication. Accordingly, in some embodiments, the system 700 may comprise an RF communication device 722 positioned in communication with and configured to be operable by the central controller 720. More specifically, the central controller 720 may operate the RF communication device 722 to generate wireless transmissions that may be received by one or more of the plurality of CRMs 710 that may include instructions executable by the CRMs 710, and the RF communication device 722 may receive transmissions from one or more of the plurality of CRMs 710 that may be relayed to the central controller 720. The RF communication device 722 may be coupled to the central controller 720 by any means or method as is known in the art, including, but not limited to, wired communication, such as a universal serial bus (USB) connection, Firewire, Thunderbolt, Ethernet, and the like. Furthermore, the communication between the central controller 720 and the RF communication device 722 may be encrypted. In some embodiments, the RF communication device 722 transmits the communications received from the central controller 720 in an encrypted state.

The system 700 may operate in multiple architectures. One is an interactive implementation, and is illustrated in FIG. 6. In the interactive implementation, the central controller is 720 a computerized device, such as a laptop, smartphone, or other computing device may read the CDF 730 and transmit the instructions comprised thereby to the plurality of CRMs 710.

Another architecture is a deployable self-forming structure (DSFS) implementation. This implementation allows for the pre-configuration of the central controller 720 and the plurality of CRMs 710 prior to deployment. The central controller 720 may be pre-programmed by a computing device 740. In some embodiments, the central controller 720 may be programmed by the computing device 740 across a network, such as a Personal Area Network, a Local Area Network, or a Wide Area Network, such as the Internet. Thereafter, the pre-configured central controller 720 and plurality of CRMs 710 may be deployed in water, land, and space applications. Such an implementation may advantageously enable deployment of the structure where transmission of instructions in situ is difficult or impossible.

Another architecture is an embedded implementation, wherein the central controller may be placed within a structure to allow for permanent operation. Examples of embedded implementation may include sensors that operate doorways. This may include doorways that require security codes or two-factor authentication and those that do not require such security protocols.

Figure 8:
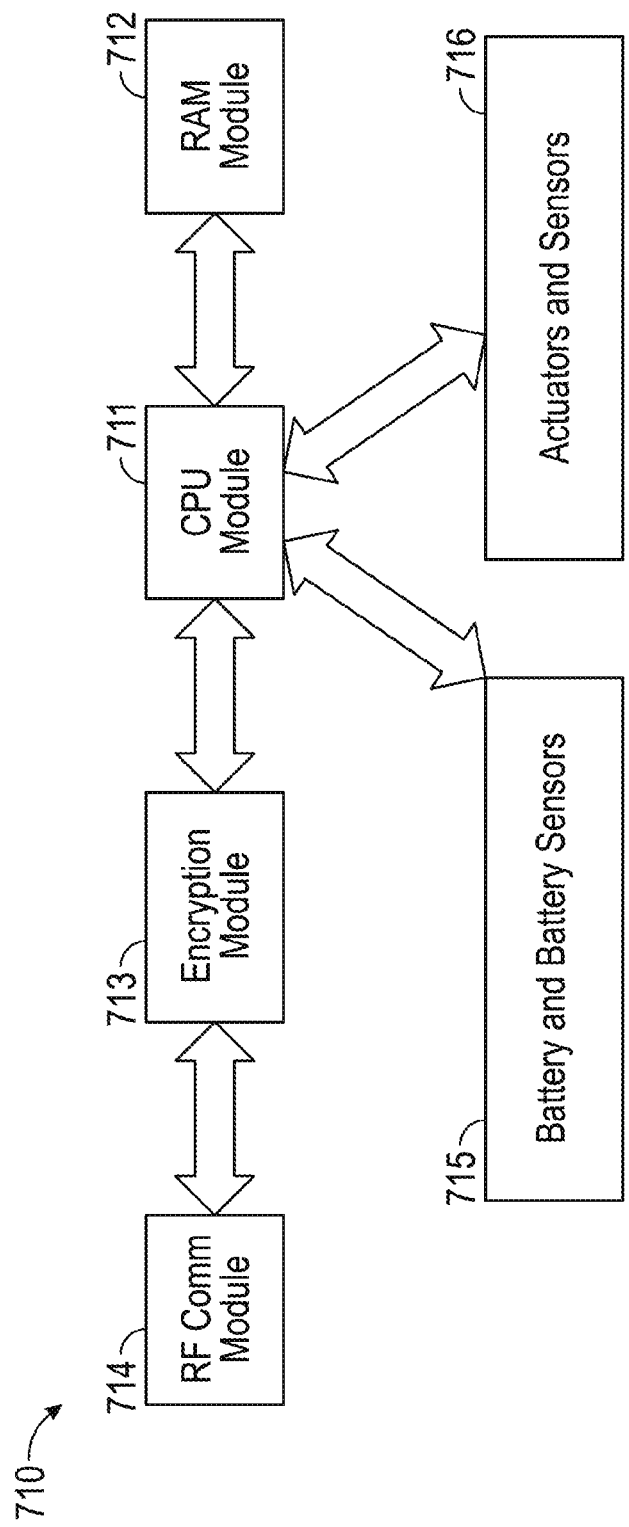
FIG. 8 is a schematic view of a CRM according to an embodiment of the invention.

Referring now to FIG. 8, additional aspects regarding the plurality of CRMs 710 will be discussed in detail. Each CRM 710 may comprise a CPU module 711, a RAM module 712 coupled to the CPU module 711, an encryption module 713 coupled to the CPU module 711 and configured to enable encryption and decryption of transmissions received by and sent from the CRM 710, and an RF communication module 714 configured to transmit and receive RF signals. The CPU module 711, RAM module 712, encryption module 713, and RF communication module 714 may be comprised by the core processor 301 of the CRM 100 described hereinabove. Each CRM 710 may further comprise a battery and battery sensors 715, the battery module 304 of above, in communication with and controllable by the CPU module 711, and actuators and sensors 716, the proximity sensor 504, hall sensor 505, and actuators 503 of above, in communication with and controllable by the CPU module 711. Additionally, the encryption module 713 may constrain the CRM 710 to be communicative with only a particular central controller 720, such that CRM 710 may not successfully attempt to communicate with another central controller 720 due to differences in encryption.

Each CRM 710 may be operable to transmit a signal to the central controller 720 indicating the status of the CRM 710. The potential statuses that may be transmitted include:

TABLE 1

| CRM Status | Description |
|---|---|
| READY | Signals a CRM is available to join a structure. CRM responds to all commands and is set to an initial configuration by the INIT command (see CRM Commands). |
| ALLOCATED | Signals CRM is an element of a structure currently under construction. CRM responds to all commands. |
| LOCKED | Signals CRM is an element of a completed structure. CRM only responds to the UNLOCK command (see CRM Commands). |
| ERROR | Signals CRM is not available to join a structure. For example, BATTLOW is an error status indicating low battery. |

Additionally, as described hereinabove, each CRM 710 may also transmit the unique serial number associated with the CRM 710 so that the central controller 720 may associate the status with the correct CRM 710.

The plurality of CRMs 710 are able to inter-communicate with other CRMs 710 without assistance of a central controller 720. In this manner, when two CRMs 710 are adjacent and/or in communication with one another, one may interrogate the other, and the reply of the status of the interrogated CRM 710 may be transmitted to the interrogating CRM 710. This may facilitate the construction of the structure by the plurality of CRMs 710. Specifically, a CRM 710 presently having a READY status may only attach to a CRM 710 having an ALLOCATED status. Accordingly, a first CRM 710 of the plurality of CRMs 710 must be given a special command to set the CRM 710 into the ALLOCATED status, such that the other CRMs 710 of the plurality of CRMs 710 may attach thereto.

Another example of inter-CRM 710 communication without the central controller 720 is power transfer capabilities between CRMs 710. CRMs 710 may transfer power to other connected CRMs 710 when the power level of a first CRM 710 is greater than 50% and the power of a second CRM 710 is less than 50%. These percentages are exemplary only, and any threshold for initiating charging between CRMs 710 is contemplated and included within the scope of the invention. This power transfer cascades throughout the structure passing power to all of the plurality of CRMs 710. When more than one CRM 710 is connected, power may be transferred to the CRM 710 of the plurality of CRMs 710 with the lowest power level. Any CRM 710 connected to an external power source may act as a source of power for all of the plurality of CRMs 710 throughout the structure formed by the plurality of CRMs 710.

Additionally, in the formation of a structure, subgroups of the plurality of CRMs 710 may be defined to correspond to substructures of the structure. The substructure may be configurable as a single CRM 710, such that the number of instructions needed to be transmitted may be reduced. This capability allows for more complex higher order structures to be constructed from the substructures.

Each face of each CRM 710 may have a logical entry regarding the status of the face, as informed by the indications provided by the sensors 716, namely, proximity and hall sensors 504, 505 described hereinabove. The potential logical entries for each face includes:

TABLE 2

| Logical Entity | Values |
| --- | --- |
| PROX | On: Another CRM is in close proximity to the Face of this CRM<br>Off: There is no CRM in close proximity to this Face |
| STATE | NORTH: Magnet is oriented to north polarity<br>SOUTH: Magnet is oriented to south polarity<br>NEUTRAL: Magnet is parallel to the Face<br>SPIN: Magnet to spinning right or left |
| CONNECTED | Yes<br>No |
| NUMBER | An integer indicating the Face number |

The CPU module 711 may maintain the logical entries of each face in a table stored on the RAM module 712. Moreover, the CPU module 711 may transmit the logical entry for any of the faces of the CRM 710 to the central controller 720 via the RF communication module 714.

Referring now back to FIG. 6, when the central controller 720 accesses the CDF 730, the CDF 730 will comprise commands that are readable and transmittable by the central controller 720, the commands further being executable by the CRMs 710. The commands comprised by the CDF 730 may include:

TABLE 3

| Command | Description | Format | Result |
| --- | --- | --- | --- |
| GET | Instructs an ALLOCATED CRM to add a CRM to a specified side and report the status change to the CC when completed. | GET (CRM1, S1) | Causes CRM1 to add a CRM to Side 1 |
| CHANGE | Instructs an ALLOCATED CRM to change the magnet orientation of a specified side and report the status change to the CC when completed | CHANGE (CRM2, S8, N) | Causes CRM2 to change the magnet orientation of Side 8 to North |
| REMOVE | Instructs an ALLOCATED CRM to remove itself from the structure, return to a READY state and report the status change to the CC when completed. | REMOVE (CRM3) | Causes CRM3 to remove itself from the structure |
| LOCK | Instructs an ALLOCATED CRM to disregard all other commands except UNLOCK | LOCK (CRM4) | Leaves CRM is current state and protects from modification |
| UNLOCK | Instructs an ALLOCATED CRM to resume accepting commands | UNLOCK (CRM5) | Leaves CRM is current state and allows further manipulation |

Additionally, the CDF 730 may further comprise subroutines that are readable and executable by the central controller 720. The subroutines comprised by the CDF 730 may include:

TABLE 4

| Subroutine | Description | Format | Result |
| --- | --- | --- | --- |
| BEGIN | This is the first action when the CC is activated | None | 1. Authenticates operator<br>2. Opens CDF, exits on error<br>3. Decrypts CDF, exits on error |
| INIT | Initializes all CRMs to READY state and acquires first ALLOCATED CRM | INIT | 1. Sets all sides of all CRMs to NEUTRAL and CRM state to READY<br>2. Instructs all CRMs to respond with status<br>3. Updates CRM count with responders in READY state<br>4. Exits CC if insufficient CRM count<br>5. The CRM to respond becomes CRM1<br>6. CRM1 Side 1 set to NORTH<br>7. Sets all READY CRMs 2 opposing sides to SOUTH and the remaining sides to SPIN. |
| BCAST | Broadcasts setting to READY CRMs | None | 1. Instructs all READY CRMs to SPIN all sides<br>2. Set various sides of all READY CRMs to NORTH or SOUTH |
| WFAL | Causes structure to breakdown in a cascading waterfall manner | None | 1. Structure is decomposed<br>2. All sides of all CRMS set to NEUTRAL<br>3. Clears CC data structure |
| END | Indicates the structure is complete | None | 1. LOCKS all ALLOCATED CRMs<br>2. Sets all sides of all READY CRMs to NEUTRAL |

TABLE 4-continued

| Subroutine | Description | Format | Result |
|---|---|---|---|
| WALK | Causes an ALLOCATED CRM to acquire a READY CRM and move it from CRM to CRM "walking" the CRM up the structure | None | 1. A new CRM is added to a level of a structure other than ground level |

Example Structure Builds

Referring now to FIGS. 9a-d, a first example of the building of a structure is presented. The present example utilizes an interactive central controller implementation to place four six-sided CRMs. FIGS. 9a-d indicate the CRM numbers and the side numbers in a 2-dimensional diagram. The side numbers represent the various sides of each six-sided CRM, which may be cubic. The CDF for this structure is as follows:

TABLE 5

BEGIN
INIT
GET (CRM1, S1)
CHANGE (CRM2, S1, N)
GET (CRM2, S1)
CHANGE (CRM3, S1, N)
GET (CRM3, S1)
END

The example illustrated in FIGS. 9a-d allows for random CRM connections. That is to say, connection between CRMs, for instance, the GET command resulting in a CRM attaching to side 1 of CRM 1, does not require any particular CRM to be attached to side 1 of CRM 1. While CRM 2 ultimately connected to CRM 1, it, could well have been CRM 3 or CRM 4 instead. This is the same for the GET commands directed to CRM2 and CRM 3.

The example begins with the operator executing the CC. This causes the CC to run the BEGIN subroutine where the operator is authenticated and the CDF is identified, located and opened. If any of these functions fail, the CC exits.

In some embodiments, CRMs in a READY status may churn, or be operating prior to receiving an instruction from the central controller, in a confined area.

Next is the INIT subroutine which first instructs all CRMs to respond with status and serial number. If the number of CRMs that respond with a READY status is greater than or equal to the required minimum number the INIT subroutine continues by instructing all sides of the four CRMs to NEUTRAL. The first responder becomes CRM1, is set to a status of ALLOCATED and is instructed to set side 1 (S1) to NORTH. The remaining CRMs in the READY state are instructed to set sides 1 and 6 to SOUTH and the remaining sides to SPIN.

The structure is now at the initial state with one CRM, as illustrated in FIG. 9a.

The next command is GET (CRM1, S1) that instructs CRM1, side 1 to connect to a READY CRM. The connected CRM becomes CRM2. Once this occurs, CRM1 sets CRM2 to ALLOCATED and sets all unconnected sides of CRM2 to NEUTRAL, as illustrated in FIG. 9b.

The next command is CHANGE (CRM2, S1, N) that instructs CRM2 to set side 6 to NORTH.

The next command is GET(CRM2, S1) that instructs CRM2, side 1 to connect to a READY CRM. The connected CRM becomes CRM3. Once this occurs, CRM2 sets CRM3 to ALLOCATED and sets all unconnected sides of CRM3 to NEUTRAL, as illustrated in FIG. 9c.

The next command is CHANGE (CRM3, S1, N) that instructs CRM3 to set side 1 to NORTH.

The next command is GET(CRM3, S1) that instructs CRM3, side 1 to connect to a READY CRM. The connected CRM becomes CRM4. Once this occurs, CRM3 sets CRM4 to ALLOCATED and sets all unconnected sides of CRM4 to NEUTRAL, as illustrated in FIG. 9d.

The last command in this example is END which causes the CC to exit leaving the structure intact.

Referring now to FIGS. 10a-j, additional aspects of the WALK command of the invention are presented and will be discussed in detail. The CDF for this structure is as follows:

TABLE 6

BEGIN
INIT
GET (CRM1, S3)
WALK (CRM2, CRM1, S4)
GET (CRM1, S3)
WALK (CRM3, CRM2, S1, CRM2, S2)
GET (CRM1, S3)
WALK (CRM4, CRM2, S1, CRM3, S2, CRM3, S4)
END

Figure 10A:
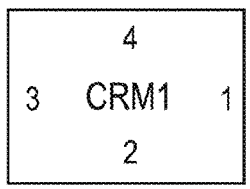

This example begins as the previous example with the same BEGIN and INIT subroutines. The structure is now at the initial state with one CRM, as illustrated in FIG. 10a.

Figure 10B:
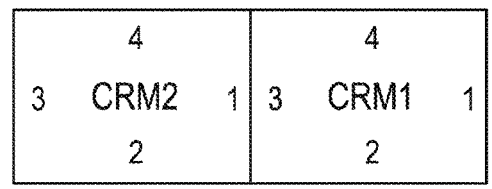

The next command is GET (CRM1, S3) that instructs CRM1, side 3 to connect to a READY CRM. The connected CRM becomes CRM2. Once this occurs, CRM1 sets CRM2 to ALLOCATED and sets all unconnected sides of CRM2, i.e., all sides other than side 1, to NEUTRAL, as illustrated in FIG. 10b.

Figure 10C:
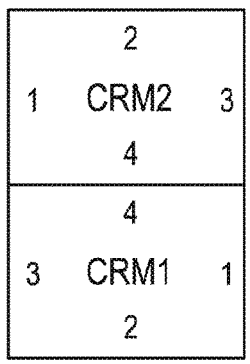
Figure 10D:
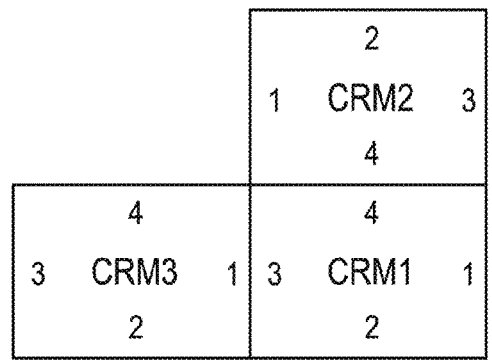

The next command is WALK (CRM2, CRM1, S4) which causes CRM2 to "walk" up CRM1 ending with CRM2 side 4 connected to CRM1 side 4, as illustrated in FIG. 10c.

The next command is GET (CRM1, S3) that instructs CRM1, side 3 to connect to a READY CRM. The connected CRM becomes CRM3. Once this occurs, CRM1 sets CRM3 to ALLOCATED and sets all unconnected sides of CRM2 to NEUTRAL. The structure now is in the configuration illustrated in FIG. 10d.

Figure 10E:
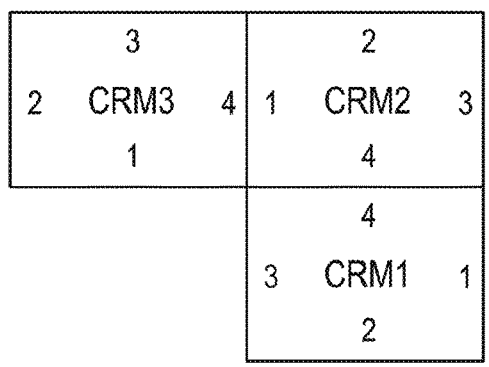
Figure 10F:
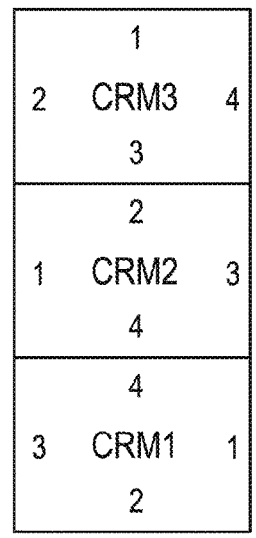

The next command is WALK (CRM3, CRM2, S1, CRM2, S2) which causes CRM3 to "walk" up CRM1 to CRM2 ending with CRM3 side 4 connected to CRM1 side 2. The first step of the WALK command is rotating CRM3 side 4 to CRM2 side 1 as illustrated in FIG. 10e. The final step is rotating CRM3 to the top of the structure connecting CRM3 side 3 to CRM2 side 2 as illustrated in FIG. 10f.

The next command is GET (CRM1, S3) that instructs CRM1, side 3 to connect to a READY CRM. The connected CRM becomes CRM4. Once this occurs, CRM1 sets CRM4 to ALLOCATED and sets all unconnected sides of CRM4 to NEUTRAL, as illustrated in FIG. 10g.

The next command is WALK (CRM4, CRM2, S1, CRM3, S2, CRM3, S4) which causes CRM4 to "walk" up CRM1 to CRM 2 then CRM3 ending with CRM4 side 2 connected to CRM3 side 4. The first step of the WALK command is rotating CRM4 side 4 to CRM2 side 1, as illustrated in FIG. 10h. The next step of the WALK command is rotating CRM4 to CRM3 side 2 as illustrated in FIG. 10i. The final step of the WALK command is rotating CRM4 to the top of the structure connecting CRM4 side 2 to CRM3 side 1 as illustrated in FIG. 10j.

The last command in this example is also END which causes the CC to exit leaving the structure intact.

Assembly Forms

Pluralities of CRMs as described above can be used in any number to form constructions of various sizes. Constructions can be generally linear, compact lattices, or complex forms. In addition to forming final constructions, CRMs may be used to create temporary constructions to facilitate the assembly of a final construction.

Figure 11A:
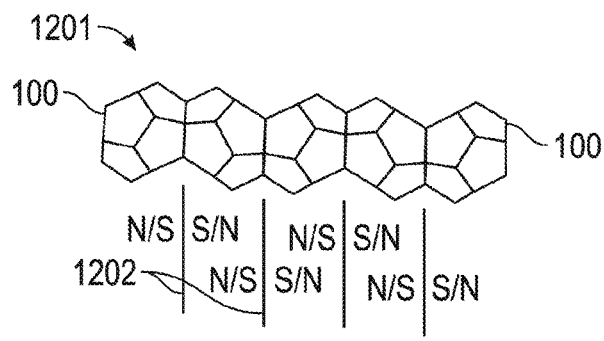
FIGS. 11a-11c are examples of CRM constructs according to embodiments of the invention.
Figure 11B:
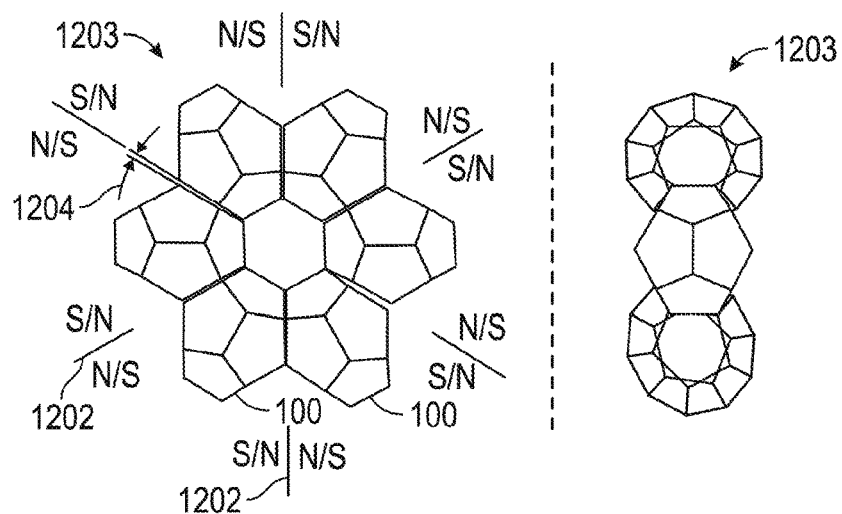
Figure 11C:
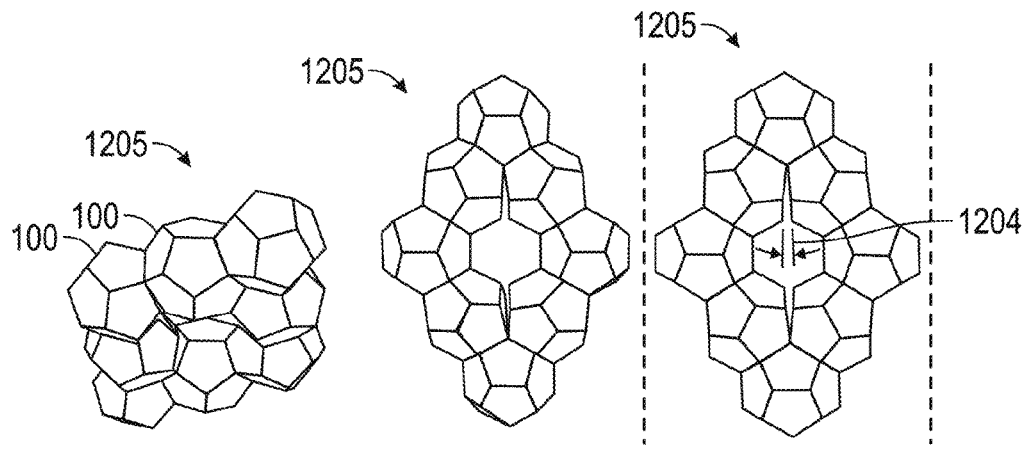

FIGS. 11a-c depict three exemplary constructions used in final configuration of the full assembly. FIG. 11a depicts a linear construction 1201 of five CRMs 100 in a line. The polar orientation of adjacent magnetic members of the CRMs 100 is represented beneath the CRMs 100 in a locked state. FIG. 11b depicts a circular construction 1203 of six CRMs 100. The polar orientation of adjacent magnetic members of the CRMs 100 is represented surrounding the construction. FIG. 11c is another circular construction 1205 containing eight CRMs 100. FIG. 11b &c has a Zip angle 1204 between each CRM 100 that can flex or deform if the structure needs flexibility or vibration dampening. In contrast, FIG. 11c limits the Zip angle 1204 to specific locations. Multiple views of the same structure are shown in FIG. 11c of circular construction 1205 defined by the assembly of eight CRMs 100.

Figure 12A:
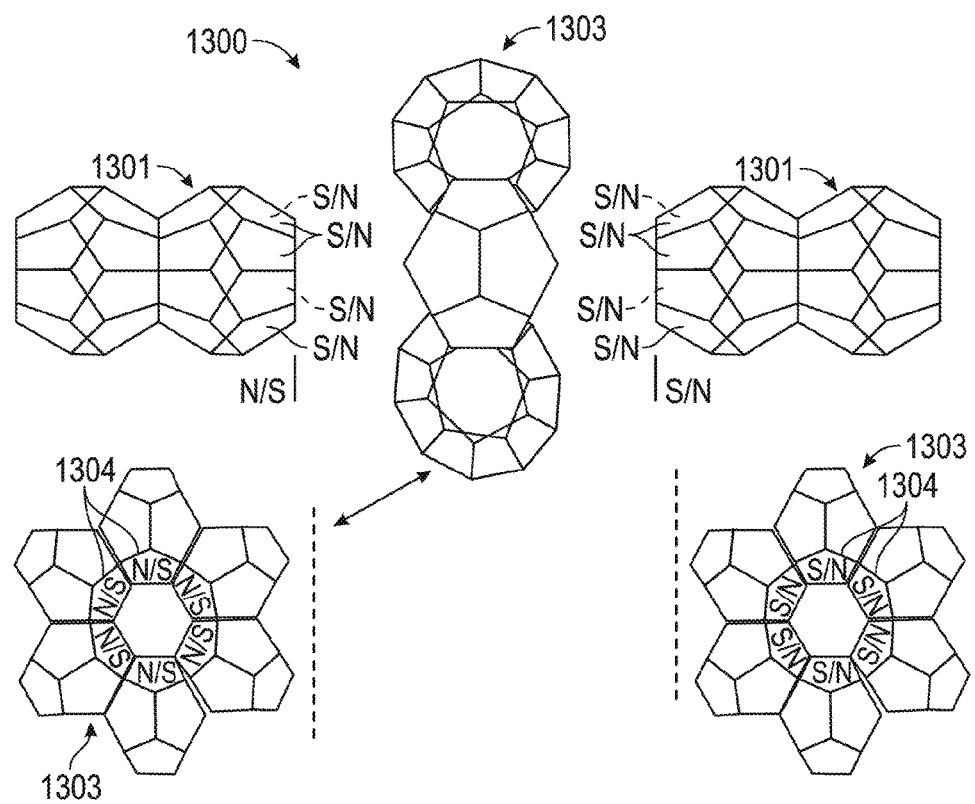
FIGS. 12a-12b are examples of frictionless bearing CRM constructs according to embodiments of the invention.
Figure 12B:
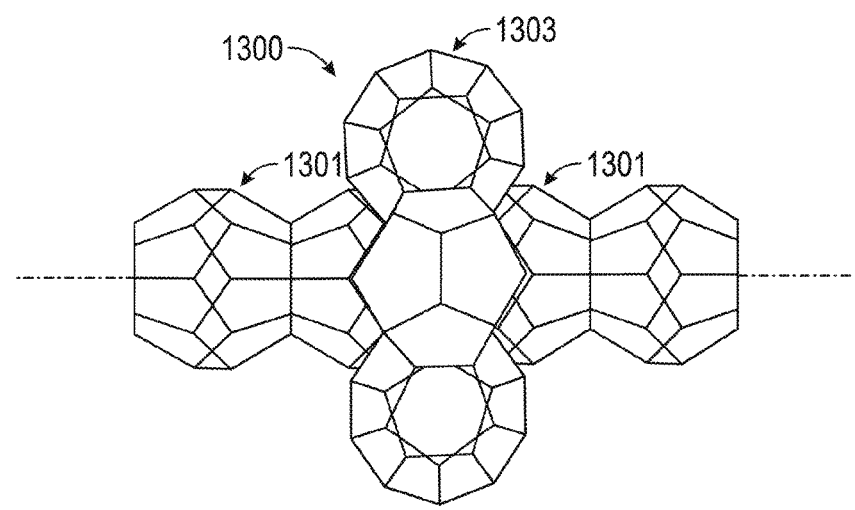

Referring now to FIGS. 12 a-b, additional constructions included within the scope of invention will be discussed. FIG. 12a is a depiction of the construction of a bearing and shaft configuration 1300. The bearing and shaft configuration may comprise two linear constructions 1301 and a circular construction 1303. The circular construction 1303 may be similar to the circular construction depicted in FIG. 11b may be constructed, including an aperture. The aperture magnets 1302 on the inside of the circular construction 1303 may and adjacent to the aperture defined by the circular construction 1303 attract the linear constructions 1301 on each side of the circular construction, such that the linear constructions 1301 are positioned on opposing sides of the circular construction 1303, along the axis of the circular construction 1303. As the linear constructions 1301 connect at the center of the circular construction 1303 they magnetically join forming a linear construction through the center of the circular construction 1303. Once the linear constructions 1301 are connected through the aperture of the circular construction 1303, the aperture magnets 1302 on either side of the circular construction 1303 may be dynamically changed to repel the faces of the linear constructions 1301. When the linear constructions 1301 are attached to the opposing sides of the circular construction 1303, as illustrated in FIG. 12b, the linear constructions 1301 comprise ten repelling faces separating the linear constructions 1301 from the circular construction 1303 allowing for near frictionless rotation. The dynamic changing of the aperture magnets 1302 may facilitate the continued repulsion of the linear constructions 1301, thereby facilitating their frictionless rotation with respect to the circular construction 1303. The shaft configuration 1300 is an exemplary construction only and does not limit the scope of the invention.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A robotic construction unit comprising:
   a processor;
   a plurality of battery modules; and
   a plurality of magnetic modules, each magnetic module comprising:
      a magnet; and
      an actuator;
   wherein each battery module is operable to provide power to at least one of the processor and a magnetic module of the plurality of magnetic modules;
   wherein the processor is operable to control the actuator;
   wherein the actuator is operable to change an orientation of the magnet with respect to an exterior face of the magnetic module;
   wherein each magnetic module is operable to alternatively establish magnetic attraction to a magnetic module of an adjacent robotic construction unit or establish magnetic repulsion to the magnetic module of the adjacent robotic construction unit.

2. The robotic construction unit of claim 1 wherein the actuator and the magnet are operable to rotate the magnet in a plane that is generally perpendicular to a plane defined by the exterior face of the magnetic module.

3. The robotic construction unit of claim 2 wherein the magnet is a permanent magnet.

4. The robotic construction unit of claim 1 wherein each magnetic module comprises a sensor operable to provide a feedback to the processor; and wherein the processor is operable to operate the magnetic modules responsive to the feedback received from the sensor.

5. The robotic construction unit of claim 4 wherein the sensor comprises at least one of a proximity sensor and a hall sensor.

6. The robotic construction unit of claim 5 wherein the sensor comprises a proximity sensor and a hall sensor; wherein the hall sensor is operable to provide feedback regarding a magnetic orientation of the magnetic module comprising the hall sensor; wherein the proximity sensor is operable to provide feedback regarding the presence of an object adjacent to the magnetic module comprising the proximity sensor, the object being defined as one of an adjacent robotic construction unit and an environmental object; and wherein the processor is operable to determine the magnetic orientation of the adjacent magnetic module from the feedback of both the proximity sensor and the hall sensor.

7. The robotic construction unit of claim 1 wherein each magnetic module comprises a communication device.

8. The robotic construction unit of claim 7 wherein the communication device is operably coupled to the processor; wherein the communication device is operable to send and receive transmissions with at least one of a remote computerized device and an adjacent robotic construction unit; and wherein the processor is operable to operate the plurality of magnetic modules responsive to a transmission received via the communication device.

9. The robotic construction unit of claim 8 wherein the processor is operable to decrypt an encrypted transmission received via the communication device.

10. The robotic construction unit of claim 7 wherein the communication device comprises a first antenna operable for near-field communication (NFC) and a second antenna operable for radio-frequency communication other than NFC.

11. The robotic construction unit of claim 1 wherein the robotic construction unit is operable to inductively receive electrical power via an induction coil comprised by the magnetic module; and wherein a battery module of the plurality of battery modules is operable to receive and store the electrical power received by the robotic construction unit.

12. The robotic construction unit of claim 11 wherein the induction coil is operable to generate a magnetic field capable of inductively providing electrical power to an adjacent robotic construction unit.

13. The robotic construction unit of claim 1 wherein each magnetic module comprises an exterior face; and wherein a plurality of exterior faces of the plurality of magnetic modules collectively define a geometric configuration of the robotic construction unit.

14. The robotic construction unit of claim 13 wherein the geometric configuration of the robotic construction unit is a platonic solid.

15. The robotic construction unit of claim 13 further comprising a frame; wherein the frame and the exterior faces of the plurality of magnetic modules form a hermetic seal.

16. The robotic construction unit of claim 1 wherein the plurality of magnetic modules each comprise an individual frame.

17. The robotic construction unit of claim 1 further comprising a processor frame; wherein the plurality of battery modules attaches to and extends outwardly from the processor frame.

18. A robotic construction unit comprising:
a processor;
a plurality of battery modules;
a plurality of magnetic modules, each magnetic module comprising:
an exterior face,
a magnet,
an actuator,
a sensor, and
a communication device;
a frame to which the processor, the battery modules, and the magnetic modules are attached;
wherein the processor is operable to control the operation of the magnetic modules;
wherein each battery module is operable to provide power to at least one of the processor and a magnetic module of the plurality of magnetic modules;
wherein the sensor is operable to provide a feedback to the processor;
wherein the processor is operable to control the operation of the actuator responsive to the feedback from the sensor;
wherein the actuator is operable to change an orientation of the magnet with respect to the exterior face of the magnetic module, thereby alternatively establishing magnetic attraction to a magnetic module of an adjacent robotic construction unit or establishing magnetic repulsion to the magnetic module of the adjacent robotic construction unit; and
wherein the communication device comprises a first antenna operable for near-field communication (NFC) and a second antenna operable for radio-frequency communication other than NFC.

19. The robotic construction unit of claim 18 further comprising a proximity sensor and a hall sensor; wherein the hall sensor is operable to provide feedback regarding a magnetic orientation of the magnetic module comprising the hall sensor; wherein the proximity sensor is operable to provide feedback regarding the presence of an object adjacent to the magnetic module comprising the proximity sensor, the object being defined as one of an adjacent robotic construction unit and an environmental object; and wherein the processor is operable to determine the magnetic orientation of the adjacent magnetic module from the feedback of both the proximity sensor and the hall sensor.

* * * * *